US 12,117,049 B2

(12) United States Patent
Viola

(10) Patent No.: US 12,117,049 B2
(45) Date of Patent: Oct. 15, 2024

(54) POSITION SENSOR ASSEMBLY

(71) Applicant: Sigma Powertrain, Inc., Livonia, MI (US)

(72) Inventor: Jeffrey Viola, Berkley, MI (US)

(73) Assignee: Sigma Powertrain, Inc., Livonia, MI (US)

(*) Notice: Subject to any disclaimer, the term of this patent is extended or adjusted under 35 U.S.C. 154(b) by 472 days.

(21) Appl. No.: 17/495,062

(22) Filed: Oct. 6, 2021

(65) Prior Publication Data

US 2023/0108459 A1  Apr. 6, 2023

(51) Int. Cl.
  *F16D 41/04*  (2006.01)
  *F16D 27/09*  (2006.01)
  *F16D 41/12*  (2006.01)
  *G01D 5/14*  (2006.01)

(52) U.S. Cl.
  CPC ............ *F16D 41/04* (2013.01); *F16D 27/09* (2013.01); *F16D 41/12* (2013.01); *G01D 5/142* (2013.01); *F16D 2300/18* (2013.01)

(58) Field of Classification Search
  CPC .......... F16D 41/04; F16D 41/12; F16D 41/14; F16D 2300/18; F16D 27/00; G01D 5/142; G01D 5/145
  See application file for complete search history.

(56) References Cited

U.S. PATENT DOCUMENTS

| 9,255,614 | B2 | 2/2016 | Kimes | |
| 9,482,294 | B2 | 11/2016 | Kimes | |
| 9,541,141 | B2 | 1/2017 | Kimes | |
| 9,562,574 | B2 | 2/2017 | Kimes | |
| 9,638,266 | B2 | 5/2017 | Kimes | |
| 11,215,245 | B2 | 1/2022 | Kimes | |
| 2005/0225317 | A1* | 10/2005 | Freeman | B60N 2/0705 324/207.2 |
| 2013/0249544 | A1* | 9/2013 | Vig | G01R 15/202 324/252 |
| 2014/0176128 | A1* | 6/2014 | Storrie | G01B 7/14 324/207.24 |
| 2017/0138766 | A1* | 5/2017 | Anastasiadis | B60R 22/48 |
| 2021/0041022 | A1 | 2/2021 | Kimes | |
| 2023/0003267 | A1* | 1/2023 | Honda | G01D 5/2451 |

FOREIGN PATENT DOCUMENTS

WO  WO-2017100032 A1 *  6/2017

* cited by examiner

*Primary Examiner* — Lori Wu
(74) *Attorney, Agent, or Firm* — Simonelli IP, PLLC

(57) ABSTRACT

A position sensing assembly for sensing a position of a ferromagnetic element. The position sensing assembly includes a magnet creating a magnetic field. A position transducer is disposed within the magnetic field created by the magnet. A housing defines an interior for housing the magnet and the position transducer therein. The housing defines a housing body and a transducer protrusion extending out from the housing body. The position transducer is housed within the transducer protrusion allowing the position transducer to extend out and away from the magnet while maintaining a parallel orientation with the magnet.

21 Claims, 4 Drawing Sheets

POSITION SENSOR ASSEMBLY

BACKGROUND ART

1. Field of the Invention

The invention relates to a position sensor assembly. More particularly, the invention relates to a position sensor assembly for sensing the position of a pivoting element used to selectively lock a rotating element.

2. Description of the Related Art

Rotating coupling assemblies can be used for devices such as clutches. A typical clutch of this nature is described in U.S. Pat. No. 9,562,574. Difficulties exist when determining the position of a strut used to couple two elements together when there is relative rotation therebetween.

SUMMARY OF THE INVENTION

A position sensing assembly for sensing a position of a ferromagnetic element. The position sensing assembly includes a magnet that creates a magnetic field. A position transducer is disposed within the magnetic field created by the magnet. A housing defines an interior for housing the magnet and the position transducer therein. The housing defines a housing body and a transducer protrusion extending out from the housing body. The position transducer is mounted within the transducer protrusion.

BRIEF DESCRIPTION OF THE DRAWINGS

Advantages will be readily appreciated as the same becomes better understood by reference to the following detailed description when considered in connection with the accompanying drawings, wherein.

DETAILED DESCRIPTION OF THE DRAWINGS

Figure 1:
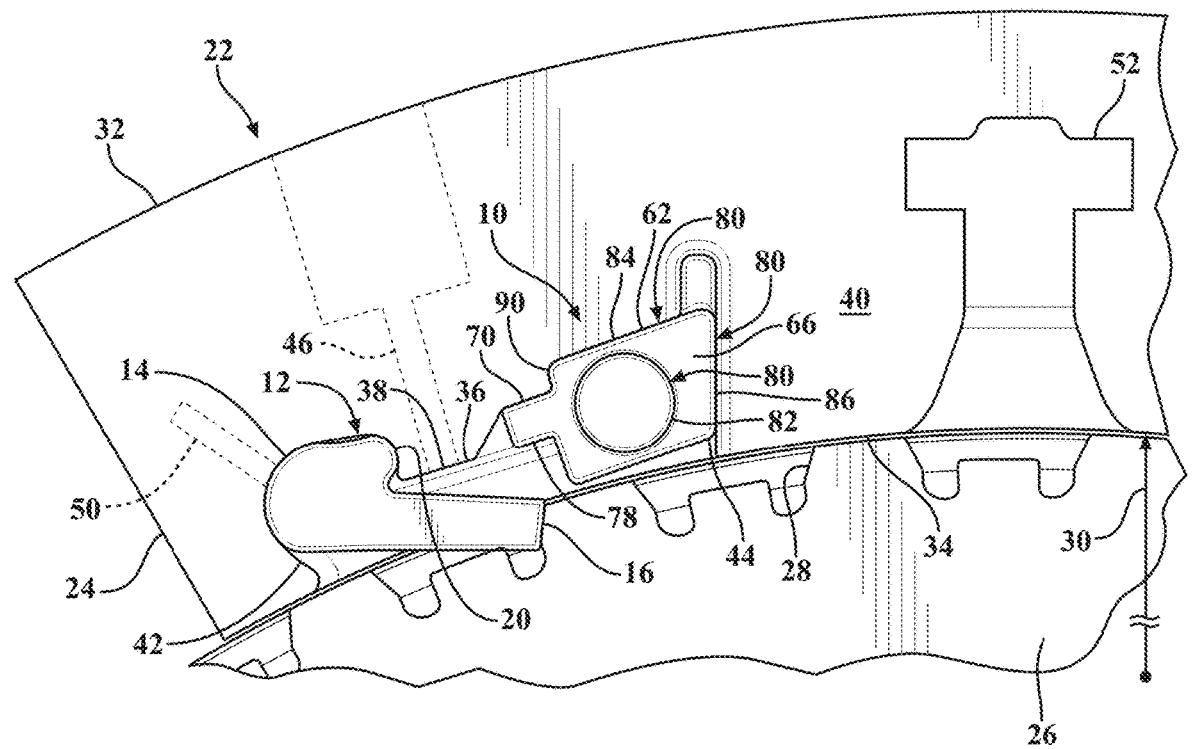
FIG. 1 is a side view of a position sensing assembly in a coupling device, partially cut away.
Figure 2:
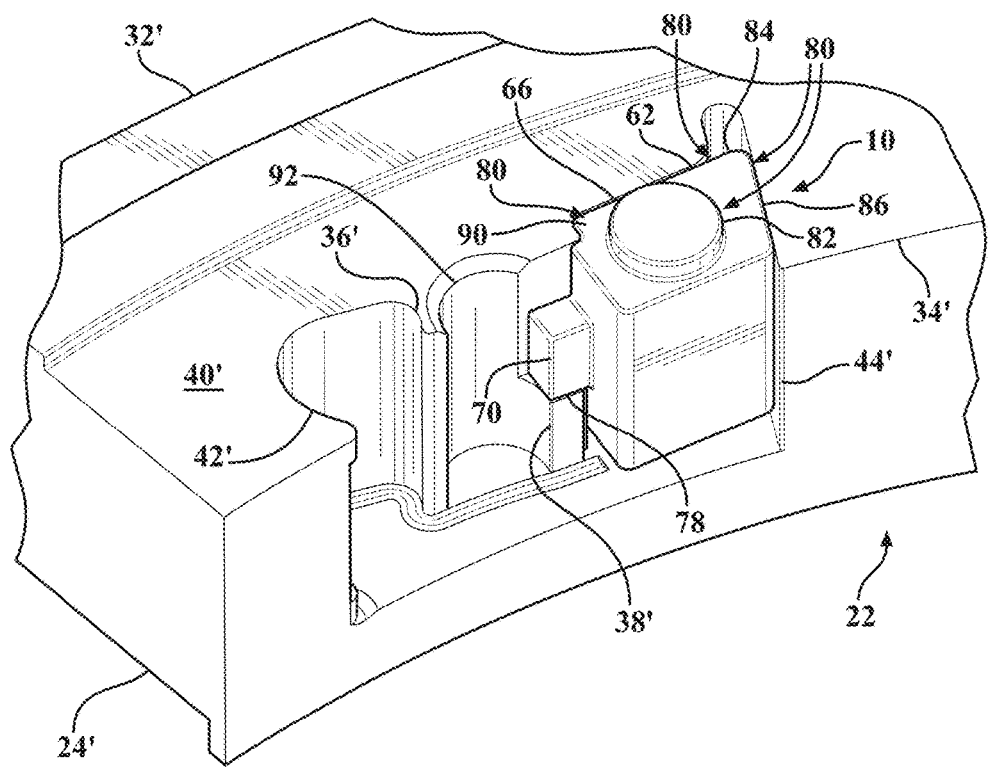
FIG. 2 is a perspective view of the position sensing assembly in a second coupling device, partially cut away.

Referring to FIGS. 1 and 2, one embodiment of a position sensing assembly is generally indicated at 10. The position sensing assembly 10 senses a position of a ferromagnetic element, generally shown at 12. In the embodiments shown, the ferromagnetic element is a strut 12 having a pivot end 14 and a distal end 16 extending out from the pivot end 14. The pivot end 14 includes a cam surface 20 to help guide the ferromagnetic element 12 as it pivots between its retracted position and its extended position (shown in FIG. 1).

A coupling assembly is generally indicated at 22. The ferromagnetic element 12 is a part of the coupling assembly 22. The coupling assembly 22 includes a pocket plate 24 and a notch plate 26, having at least one notch 28. The pocket plate 24 defines a central axis, an inner diameter 30 and an outer surface 32. The outer surface 32 may or may not be defined by an outer diameter. An inner surface 34 is cylindrical in shape and has a circular cross section defined by the inner diameter 30.

The pocket plate 24 includes at least one pocket 36. The at least one pocket 36 extends from the inner surface 34 into an interior 40 of the pocket plate 24. The at least one pocket 36 includes a strut stop 38, a strut portion 42 and a sensor portion 44. The two portions 42, 44 are at either end of the at least one pocket 36. A plunger access port 46 provides access to the at least one pocket 36 allowing a plunger (not shown) of a solenoid (not shown) to move the strut 12 from its retracted position to its extended position. A spring (not shown) housed within a spring recess 50, which biases the strut 12 in the retracted position.

At least one speed sensor port 52 extends through at least a portion of the pocket plate 24. A speed sensor (not shown) senses rotational speed of the notch plate 26. In the preferred embodiment, there are multiple speed sensors and speed sensor ports 52 to provide redundant signals regarding the speed of the notch plate. 26.

Due to the speeds with which the notch plate 26 will be rotating, it is a primary importance to know when the strut 12 is in its retracted position and when it is in the extended position. It is also a primary importance to move the strut 12 from its retracted position to its extended position when the relative speed between the pocket 24 and notch 26 plates is below a predetermined threshold value. Damage to the strut 12 and/or one or both of the plates 24, 26 can occur if the strut 12 moves to its extended position when the relative rotational speed between the plates 24, 26 is too great.

In order to know exactly what position the strut 12 is in, the position sensor assembly 10 is used. The position sensor assembly 10 includes a magnet 54, which creates a magnetic field, graphically represented in the Figures with flux lines 56. The magnet 54 is a permanent magnet bar magnet and has an orientation substantially parallel to the strut 12 when the strut 12 is in its retracted position. More specifically, the magnet 54 and the strut 12 are coplanar and coaxial when the strut 12 is in its retracted position. The magnet 54, as well as the entire position sensor assembly 10, is permanently positioned within the at least one pocket 36. The position sensor assembly 10 does not move inside the at least one pocket 36 to ensure the position of the strut 12 is known in absolute terms.

Figure 6:
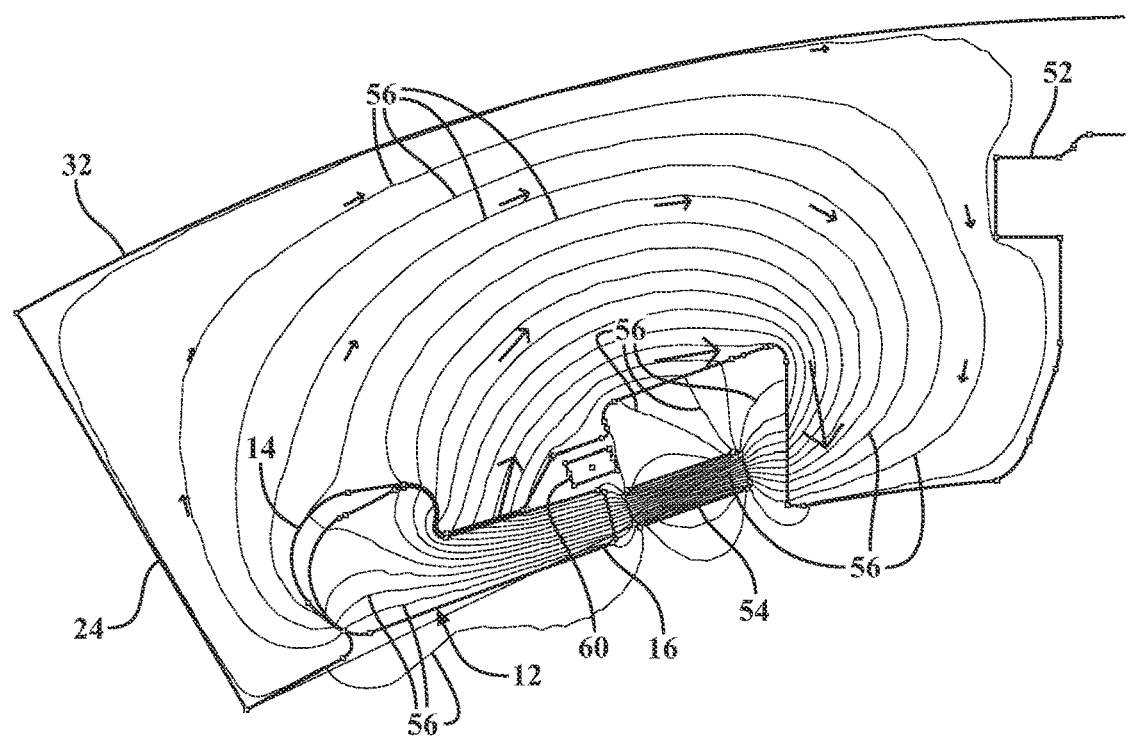
FIG. 6 is a schematic drawing of the position sensing assembly in a coupling device with magnetic field flux lines mapped thereon when a coupling element is in an unlock position.
Figure 7:
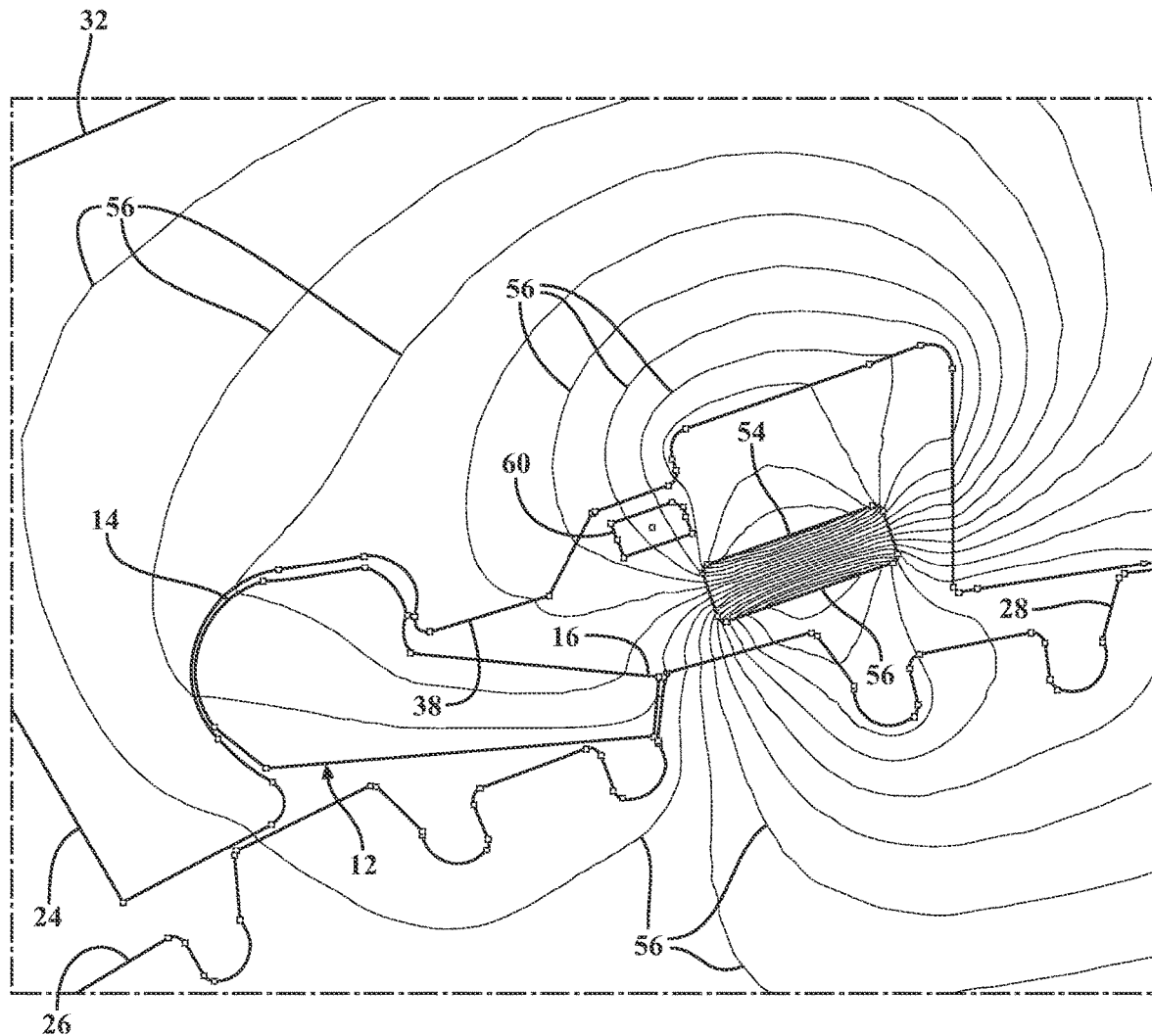
FIG. 7 is a schematic drawing of the position sensing assembly in a coupling device with magnetic field flux lines mapped thereon when a coupling element is in a lock position.

The position sensor assembly 10 also includes a position transducer 60 (best seen in FIGS. 6 and 7). The position transducer 60 is mounted within the position sensor assembly 10 such that it is disposed within the magnetic field 56 created by the magnet 54. The position transducer 60 is parallel to the magnet 54 but askew therefrom. In other words, the position transducer 60 is not aligned with the magnet 54 even though it is parallel to and spaced apart from the magnet 54. While the position transducer 60 may be any type of transducer that may be affected by a magnetic field, the position transducer 60 of the preferred embodiment incorporates a Hall effect transducer, that is incorporated with the necessary electronics to form a Hall effect sensor.

The position sensor assembly 10 also includes a housing 62. The housing 62 defines an interior 64 for housing the magnet 54 and the position transducer 60 therein. The housing includes a primary housing body 66 and a transducer protrusion 70 extending out from the primary housing body 66. The primary housing body 66 houses the magnet 54, whereas the transducer protrusion 70 houses the position transducer 60 therein. In other words, the position transducer 60 is mounted within the transducer protrusion 70. The transducer protrusion 70 extends out from the primary housing body 66. This configuration allows the strut 12 to be coplanar with the magnet 54, and both the strut 12 and the magnet 54 to be parallel to the position transducer 60 when the strut 12 is in the retracted position.

Figure 3:
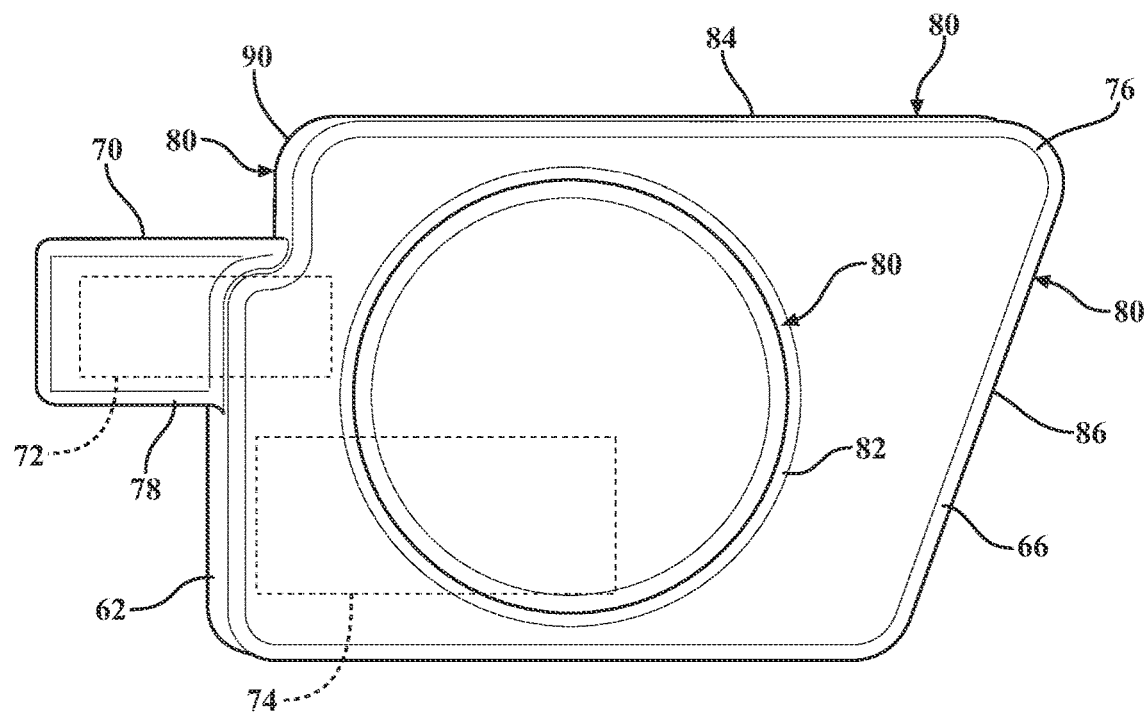
FIG. 3 is a side view of the housing for the position sensing assembly with interior ports shown in phantom.
Figure 4:
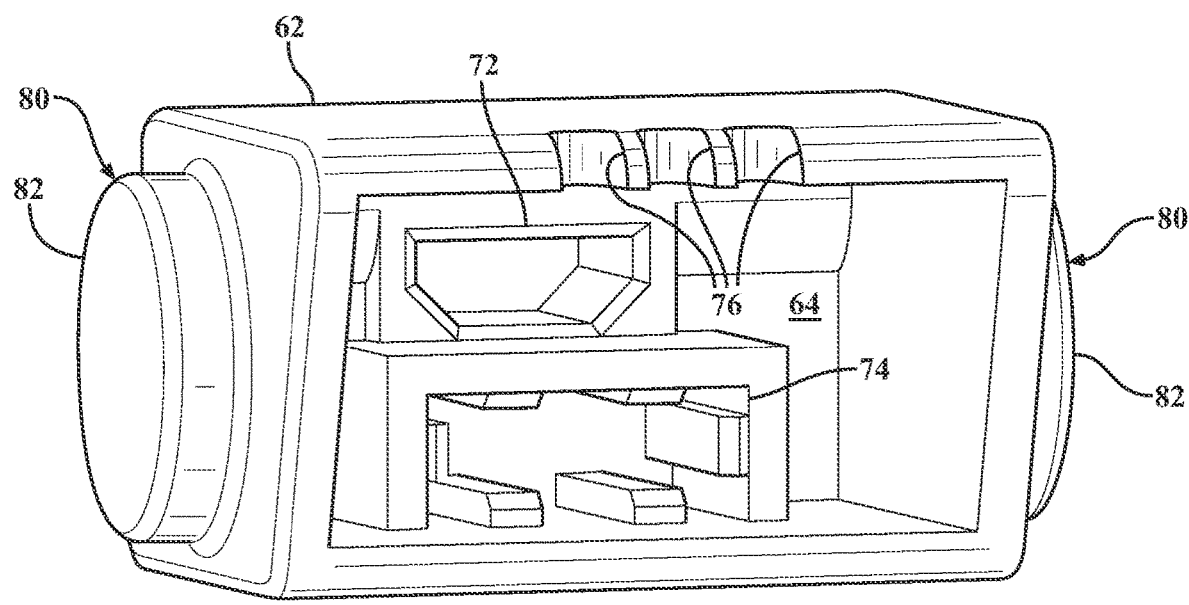
FIG. 4 is perspective view of an interior of the housing for the position sensing assembly.

Referring to FIGS. 3 and 4, the interior 64 includes a transducer port 72 and a magnet port 74. The transducer port 72 receives and positions the position transducer 60 therein. The magnet port 74 receives and positions the magnet 54 therein. Each of these ports 72, 74 are designed to receive their respective items therein in a manner such that they are correctly oriented and positioned and will not lose their position or orientation. Conductor ports 76 allow power and any signal conductors (none shown) to extend from the position transducer 60 and the controls that extend out and away from the coupling assembly 22.

The transducer protrusion 70 includes an alignment surface 78 against which the strut 12 selectively aligns. When the strut 12 is in its retracted position, it aligns with the alignment surface 78, allowing the strut 12 and the position transducer 60 to disposed adjacent each other and parallel.

The housing 62 includes orientation elements, generally shown at 80, that orient the housing 62 in a position with respect to the ferromagnetic element or strut 12. As stated above, it is essential that the housing 62 be in a defined position and orientation so that the position sensing assembly 10 can identify the position of the strut 12. As such, the housing 62 includes these orientation elements 80 to ensure its location is known and invariable.

The orientation elements 80 include at least one side boss 82 extending out from the housing 62. In the embodiment shown, there are two side bosses 82, each extending out of a side surface of the housing 62. Each of the side bosses 82 are cylindrical in shape wherein the cylinder has a circular cross section. The side bosses 82 are received by positioning holes (not shown) in the pocket plate 24 and a cover plate (not shown) that extends over the pocket plate 24, the at least one pocket 36 and everything mounted within the at least one pocket and the at least one speed sensor port 52.

The orientation elements 80 also include first 84 and second 86 orientation sides. The first 84 and second 86 orientation sides form an acute angle. The orientation elements 80 also include a shoulder 90. The orientation sides 84, 86 and the shoulder 90 work together with the side bosses 82 to maintain the orientation and position of the housing 62. More specifically, the orientation elements 80 maintain the orientation and position of the housing 62 without the need for fasteners, snaps, glue or the like to keep the housing 62 in its proper position and orientation.

Referring to FIG. 2, wherein like elements are represented by primed reference numerals, the position sensing assembly 10 is housed within a pocket plate 24'. The pocket plate 24' differs from the pocket plate 24 of FIG. 1 in that the actuation of the strut (not shown) in FIG. 2 is done by an actuator that moves perpendicular to the pocket plate 24'. An arcuate surface 92 (a portion of a cylindrical surface) provides the space for a plunger (not shown) to move into the at least one pocket 36' and move the strut to its extended position. To provide space for the plunger to come in at this angle, the strut stop 38' only extends behind the transducer protrusion 70 (from the perspective shown in FIG. 2). The strut stop 38' prevents unnecessary physical contact between the strut and the transducer protrusion 70.

Figure 5A:
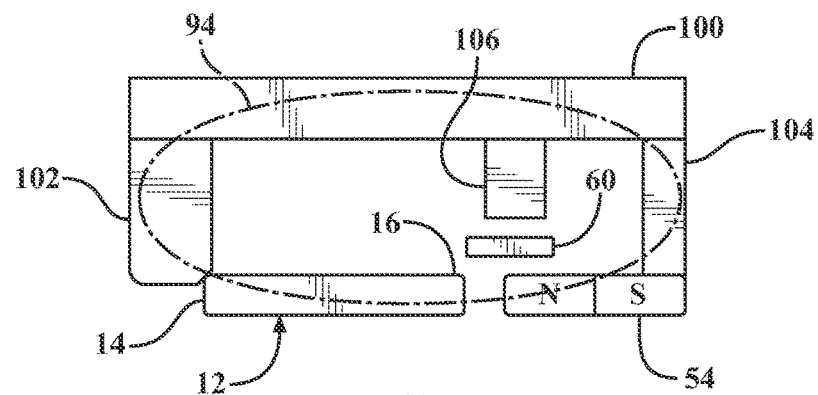
FIGS. 5A and 5B are schematic renderings of the paths through which a magnetic field created by the position sensing assembly flows.
Figure 5B:
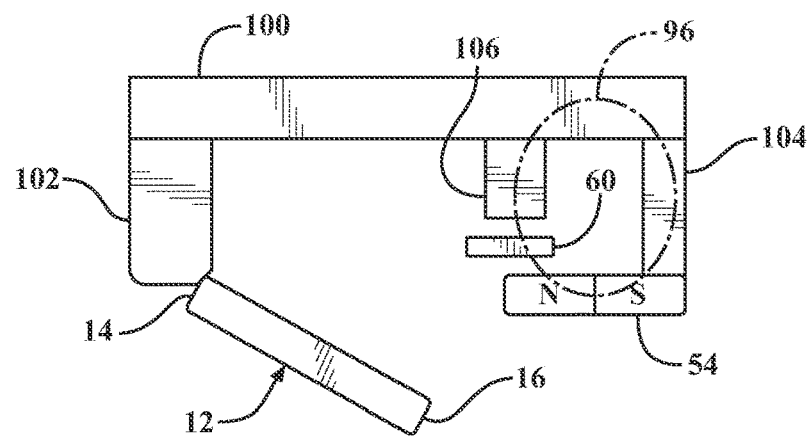

FIGS. 5A and 5B are schematic representations of the operation of the position sensing assembly 10 in combination with the strut 12, and the pocket 24 and notch 26 plates (together forming the coupling assembly 22). FIGS. 6 and 7 are mathematical models of the magnetic field 56 during the conditions shown in FIGS. 5A and 5B, respectively. The operation of this system revolves around the using two separate magnetic loop paths to create a nearly digital circuit to identify when the strut 12 is in the retracted position and when it is in the extended position where it positively engages the at least one notch 28 of the notch plate 26.

The magnetic field 56 is graphically represented by a single loop 94 in FIG. 5A. The single loop 94 shows the majority of the magnetic field 56 will move through the path of least resistance, which happens to be through ferromagnetic elements. Those elements include the magnet 54, the strut 12, and the pocket plate 24 (graphically represented by bars 100, 102, 104 and 106). Because the strut 12 is ferromagnetic and the position transducer 60 is not, the magnetic field 56, 94 travels through the strut 12 and not the position transducer 60. The magnetic field 56, 94 is essentially shunted around the position transducer 60. The lack of magnetic field 56, 94 through the position transducer 60 indicates the strut 12 is in the retracted position allowing the notch plate 26 to rotate freely with respect to the pocket plate 24.

The magnetic field 56 is graphically represented by a single loop 96 in FIG. 5B. The single loop 96 shows the majority of the magnetic field 56 existing through the path of least resistance, which no longer includes the strut 12 because the strut 12 has pivoted away from the magnet 54. The single loop 96 now shows the magnetic field 56, 96 passing through the position transducer 60. When the position transducer 60 detects the magnetic field 56, 96, it indicates the strut 12 is in the extended position preventing the notch plate 26 from rotating freely with respect to the pocket plate 24. The mathematical representation of the single loop 96 is shown in FIG. 7 with flux lines 56 passing directly through the position transducer 60.

By positioning the position transducer 60 parallel to, yet spaced apart from, the magnet 54 enables the signal-to-noise ratio to increase dramatically. A test fixture was used to collect data on the design. Data below was taken in a coupling assembly 22 fabricated with 1020 steel and with a 1.5 mm thick magnet 54 instead of the 2.5 mm magnet 54 (which was used to generate the math models shown in FIGS. 6 and 7).

| Sensor | Strut 12 Closed (mV) | Strut 12 Open (mV) | Change in signal measured (mV) | Delta magnetic field (G) |
|---|---|---|---|---|
| A | 1895 | 719 | 1176 | 376.32 |
| B | 1991 | 643 | 1348 | 431.36 |
| A | 1908 | 811 | 1097 | 351.04 |
| B | 2022 | 730 | 1292 | 413.44 |

Having a nearly 400 G change in detected strength of the magnetic field 56 is substantial and is readily detectable.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A position sensing assembly for sensing a position of a ferromagnetic element, said position sensing assembly comprising:
   a magnet creating a magnetic field;
   a position transducer disposed within the magnetic field created by said magnet; and
   a housing defining an interior for housing said magnet and said position transducer therein, wherein said interior includes a transducer port and a magnet port for receiving said position transducer and said magnet therein, respectively, said housing defining a primary housing body and a transducer protrusion extending out from said primary housing body with said position transducer mounted within said transducer protrusion.

2. A position sensing assembly as set forth in claim 1 wherein said transducer protrusion includes an alignment surface against which the ferromagnetic element selectively aligns.

3. A position sensing assembly as set forth in claim 1 wherein said position transducer and said magnet are parallel to each other when said position transducer is inserted into said transducer port and said magnet is inserted into said magnet port.

4. A position sensing assembly as set forth in claim 1 wherein said housing includes orientation elements to orient said housing in a position with respect to the ferromagnetic element.

5. A position sensing assembly as set forth in claim 4 wherein said orientation elements include at least one side boss extending out from said housing.

6. A position sensing assembly as set forth in claim 5 wherein said orientation elements include first and second orientation sides.

7. A position sensing assembly as set forth in claim 6 wherein said orientation elements includes a shoulder.

8. A position sensing assembly as set forth in claim 7 wherein said at least one boss is a cylinder with a circular cross section.

9. A position sensing assembly as set forth in claim 8 wherein said first and second orientation sides form an acute angle.

10. A coupling assembly comprising:
    a pocket plate an inner diameter, said pocket plate defining at least one pocket having a pocket opening at said inner diameter;
    a notch plate coaxial with said pocket plate and defining an outer diameter less than said inner diameter of said pocket plate, said notch plate including at least one notch cut into said notch plate at said outer diameter;
    at least one ferromagnetic element housed within said at least one pocket, said at least one ferromagnetic element extending between a pivot end and a distal end wherein said at least one ferromagnetic element pivots about said pivot end allowing said distal end to be positioned within said at least one pocket, and allowing said distal end to extend out of said at least one pocket such that said distal end is positioned to engage said at least one notch in said notch plate to prevent said notch plate from rotating; and
    at least one position sensor sensing a position of said one least ferromagnetic element, said at least one position sensor including a magnet that creates a magnetic field, a position transducer disposed within the magnetic field created by said magnet, and a housing defining an interior for housing said magnet and said position transducer therein, said housing defining a primary housing body and a transducer protrusion extending out from said primary housing body with said position transducer mounted within said transducer protrusion.

11. A coupling assembly as set forth in claim 10 wherein said interior includes a transducer port and a magnet port for receiving said position transducer and said magnet therein, respectively.

12. A coupling assembly as set forth in claim 11 wherein said transducer protrusion includes an alignment surface against which said ferromagnetic element selectively aligns.

13. A coupling assembly as set forth in claim 11 wherein said position transducer and said magnet are parallel to each other when said position transducer is inserted into said transducer port and said magnet is inserted into said magnet port.

14. A coupling assembly as set forth in claim 10 wherein said housing includes orientation elements to orient said housing in a position with respect to said ferromagnetic element.

15. A coupling assembly as set forth in claim 14 wherein said orientation elements include at least one side boss extending out from said housing to be received in said pocket plate.

16. A coupling assembly as set forth in claim 15 wherein said orientation elements include first and second orientation sides.

17. A coupling assembly as set forth in claim 16 wherein said orientation elements includes a shoulder.

18. A coupling assembly as set forth in claim 16 wherein said at least one boss is a cylinder with a circular cross section.

19. A coupling assembly as set forth in claim 18 wherein said first and second orientation sides form an acute angle.

20. A coupling assembly as set forth in claim 15 wherein said at least one pocket includes first and second pocket orientation sides that complement said first and second orientation sides, respectively, such that said at least one position sensor is received by said pocket with no lost motion therebetween.

21. A coupling assembly as set forth in claim 10 wherein said at least one pocket includes a strut stop preventing said at least one ferromagnetic element from pivoting into said transducer protrusion when said distal end of said at least one ferromagnetic element is pivoted into said at least one pocket.

* * * * *